United States Patent [19]

Vindez

[11] 4,418,767
[45] Dec. 6, 1983

[54] INTERCHANGEABLE VALVE SYSTEM FOR HYDRAULIC REVERSAL OF POSITIVE FEED DRILL

[75] Inventor: Pierre G. Vindez, Redondo Beach, Calif.

[73] Assignee: P. V. Tool Inc, Gardena, Calif.

[21] Appl. No.: 244,673

[22] Filed: Mar. 17, 1981

[51] Int. Cl.³ .................... B23B 47/22; B23Q 5/20
[52] U.S. Cl. ............................... 173/19; 173/29; 173/47; 173/145; 408/14; 408/132; 408/137
[58] Field of Search ............... 173/4, 19, 29, 47, 145; 408/11, 12, 14, 15, 132, 137

[56] References Cited

U.S. PATENT DOCUMENTS 3,512,434  5/1970  Juhasz et al. ................... 408/132
3,797,583  3/1974  Quackenbush ................... 173/145

Primary Examiner—James G. Smith
Assistant Examiner—K. Bradford Adolphson
Attorney, Agent, or Firm—Freilich, Hornbaker, Wasserman, Rosen & Fernandez

[57] ABSTRACT

In a positive feed power drill having a spindle drive gear train and a spindle feed gear train, and having hydraulic (air) means for actuating a piston to disengage the feed gear train for automatic retraction of the spindle, provision is made for field alteration of a valve in the hydraulic system, and associated actuating mechanism, to automatically reverse the positive feed when the spindle has been driven either (1) a predetermined extent set by a nut on the spindle which engages an arm over a valve stem and pushes the valve stem to a reversing position or (2) to a predetermined stop when countersinking, at which time the spindle stops advancing, thereby causing the spindle feed gear to have a tendency to move upwardly in the spindle actuator housing. The choice is made by inserting into a valve sleeve in the housing either a valve stem with an arm for direct actuation by a spindle nut or a valve stem adapted for actuation by a system of levers to control hydraulic pressure to the piston for the same effect in the second case. The system of levers for the second choice is contained in a cap which replaces the normal cap over the actuator housing.

2 Claims, 11 Drawing Figures

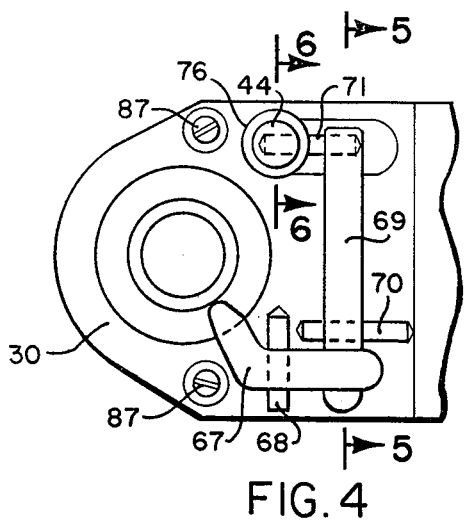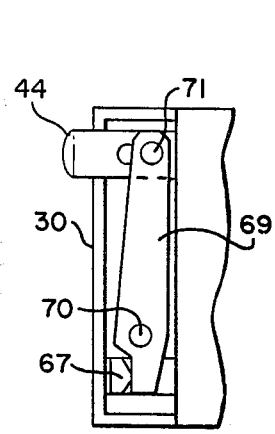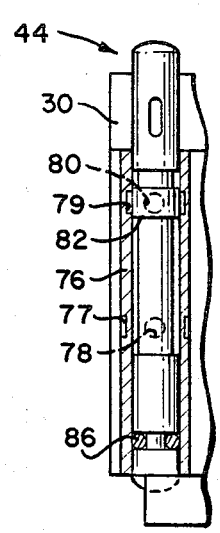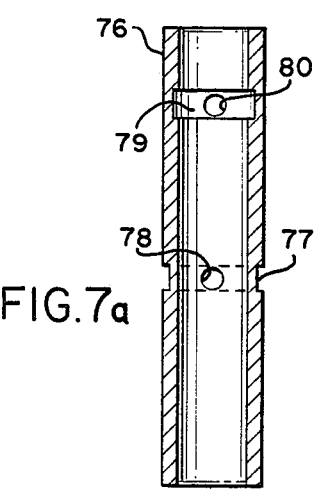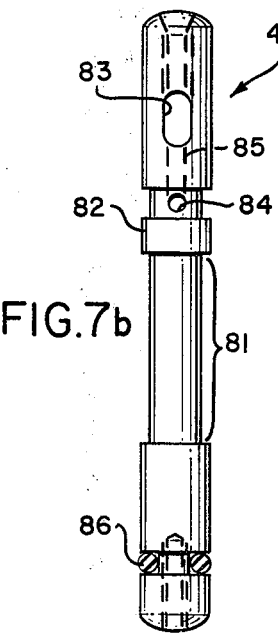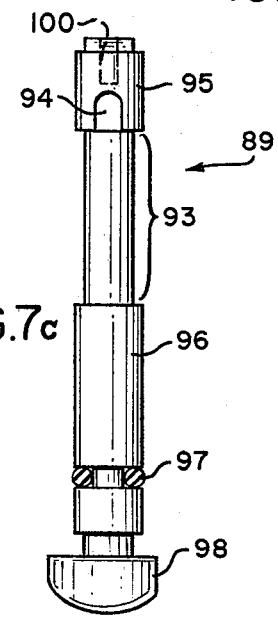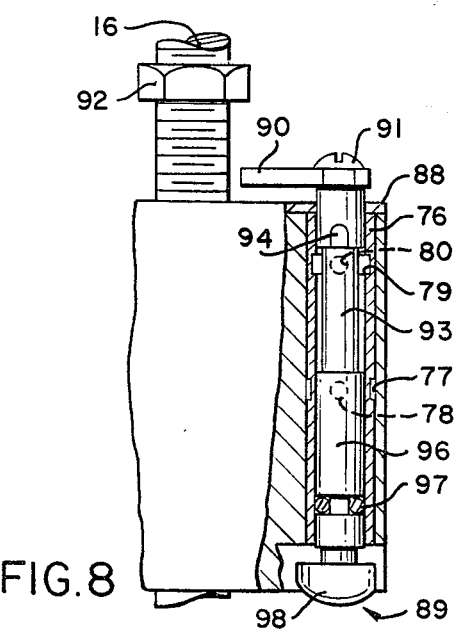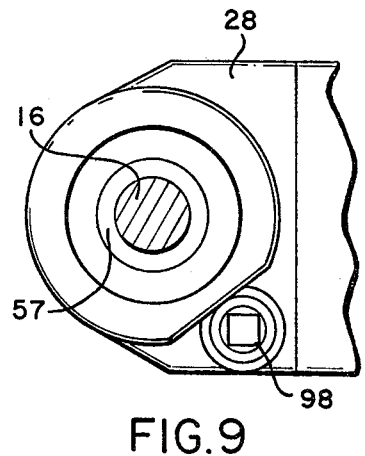

INTERCHANGEABLE VALVE SYSTEM FOR HYDRAULIC REVERSAL OF POSITIVE FEED DRILL

BACKGROUND OF THE INVENTION

This invention relates to positive feed power drills, having a spindle drive gear train and a spindle feed gear train arranged to be driven by the same motor, and having a hydraulic (air) piston to disengage the spindle feed gear train for reversal of the positive feed drive, and more particularly to an interchangeable valve system for actuating the hydraulic system when the spindle has been driven a predetermined amount through a work piece, or when the spindle stops advancing a countersinking bit into a work piece.

Positive feed power drills normally have a single motor for turning a spindle through a drive gear train. The spindle is threaded into a feed gear that turns at a predetermined rate faster than the turning rate of the spindle for advancing the spindle as the drill progresses through a work piece. The feed gear is driven by a gear train from the same motor as the drive gear train. The gear ratio of the drive gear train is selected to be slightly less than the gear ratio of the feed gear train so the feed gear will turn slightly faster than the drive gear. In that way, the spindle is advanced a predetermined amount for each turn. Once the spindle has been advanced sufficiently, a hydraulic piston is actuated to disengage the spindle feed gear train from the motor and lock it in place. As the motor continues to drive the spindle in the same direction, the spindle threads turn inside the locked feed gear to rapidly retract the spindle.

It is often desirable to use the same power drill to countersink a hole that has just been drilled in a workpiece. Any mechanism used to actuate the piston to reverse the positive feed drive after the spindle has been advanced a predetermined extent is not suitable for retraction after countersinking because, when countersinking, the spindle is intended to advance until it cannot progress further. Progress is stopped by a flange on the countersinking bit which engages the top of the workpiece. At that time, the piston should be actuated to reverse the positive feed drive.

SUMMARY OF THE INVENTION

The present invention is practiced in a positive drive power drill having a threaded spindle passing through an internally threaded feed gear, a drive gear slidably locked onto the spindle, a drive gear train extending from a drive motor through a coupling gear to the spindle drive gear to turn the spindle at a rate set by the motor through this gear train, and a spindle feed gear train extending from a coupling gear to the spindle feed gear. The spindle drive coupling gear is releasably locked to the spindle feed coupling gear for turning the spindle feed gear as the spindle drive gear is turned by the motor. The gear ratios for the two trains are selected to drive the spindle feed gear at a faster rate than the spindle drive gear. The two coupling gears are mounted on a common shaft in the main housing for the drill with a flange on the shaft under the feed coupling gear. A hydraulic piston is attached to the shaft at one end thereof for raising the shaft, thereby also raising the feed coupling gear out of engagement with the drive coupling gear, and locking the spindle feed gear train while the spindle drive gear train continues to turn. That reverses the spindle feed to retract the spindle.

Hydraulic pressure is provided to the piston through a passage in the main housing which is normally blocked by a valve stem in one position. Pushing the valve stem to an alternate position unblocks the passage. This is accomplished by having a valve sleeve with two axially displaced orifices, one to the passage connected to a source of air pressure, and one to the passage connected to the piston cylinder. The valve stem, which has a reduced diameter section between its two ends is normally positioned with this reduced diameter section over only one orifice. When the valve stem is actuated to its alternate position, this reduced diameter section is positioned over both orifices to allow air under pressure to reach the hydraulic piston. Actuation of the valve stem is done in one case (for drilling only) by a nut on the spindle which engages an arm extending from the end of the valve stem. The end of the valve stem protrudes from the actuator housing for the spindle drive and feed gears. Once the spindle is retracted, the valve stem is returned to the first position by suitable means, such as a manually pushed button on the end of the valve stem protruding from the lower side of the actuator housing.

For countersinking, a plate at the top of this actuator housing is replaced with a plate which includes a collar that is supported on a shoulder of the spindle, and a system of levers actuated by upward motion of this collar caused by the spindle backing up into the housing while the feed gear is still being turned once the countersinking bit reaches its stop. The system of levers thus actuated pushes a replacement valve stem to a second position which places the reduced diameter section thereof over both orifices in the valve sleeve. In a preferred embodiment, actuation of the valve stem is in the opposite direction from that in the case of drilling only so that the orifice to the hydraulic pressure passage is normally open and the orifice to the piston passage is normally closed, which is the reverse of the other case. Moving the valve stem to its alternate position uncovers the orifice to the piston passage without covering the orifice to the hydraulic passage. However, this is a matter of design choice on the lever system selected, but because of space limitations below the actuator housing while countersinking, this reverses actuation of the valve stem, as preferred. The cap containing the actuating collar and system of levers is easily replaced on the actuator section, when the valve stem is replaced to change the function of the drill.

The novel features that are considered characteristic of this invention are set forth with particularity in the appended claims. The invention will best be understood from the following decription when read in connection with the accompanying drawings.

BRIEF DESCRIPTION OF THE DRAWINGS

FIG. 4 is a top view of FIG. 3.

FIG. 5 is a sectional view taken on line 5—5 in FIG. 4 of just the cap shown in FIGS. 1 through 4.

FIG. 6 is a vertical section taken on a line 6—6 in FIGS. 3 and 4.

FIGS. 7a, 7b and 7c illustrate in respective views a cross section of a valve sleeve shown in FIG. 6, a valve stem to be used while countersinking and an alternate valve stem to be used for drilling.

FIG. 8 is a sectional view taken on the same line 6—6 of FIGS. 3 and 4 but with a replacement valve stem in a midposition as a second alternative in accordance with the invention.

FIG. 9 is a bottom view of that portion of the drill shown in FIG. 2 with the valve stem shown in FIG. 8.

DESCRIPTION OF PREFERRED EMBODIMENTS

Figure 1:
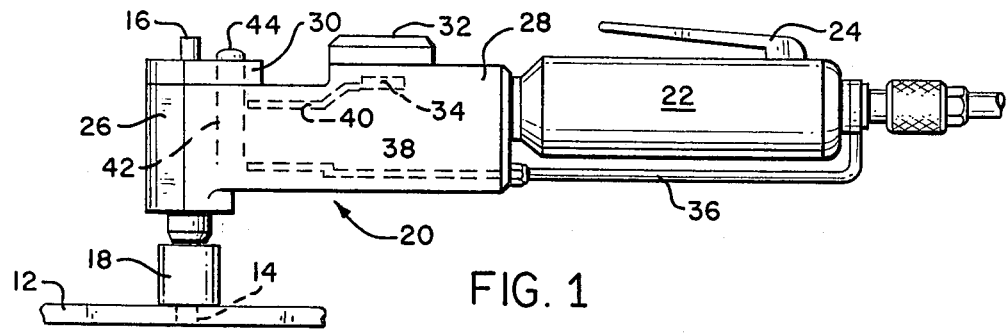
FIG. 1 is a side view in elevation of a positive feed drill embodying the present invention for countersinking holes drilled through a work piece.

Referring to FIG. 1, a positive feed drill is shown on a work piece 12 through which a hole 14 is to be made and countersunk by a drill bit on the end of a spindle 16 inside a spacer 18. In practice, the spacer is attached to a main housing 20 of the drill, and the entire assembly is either clamped or hand held to the work piece. An air driven motor 22, with a hand operated lever switch 24, drives the spindle through a gear train in the main housing 20.

The main housing 20 encloses a spindle actuator section 26 and a gear train section 28. These two sections include a spindle drive gear train for turning the spindle and a spindle feed gear train for advancing the spindle as it turns. A cap 30 on the section 26 provides access to the spindle actuator mechanism and a cap 32 provides access to a piston 34 in the gear train section which disengages the spindle feed gear train and locks it so that continued turning of the spindle drive gear train retracts the spindle when the piston is caused to move up in a cylinder under hydraulic pressure introduced through a tube 36 that couples air under pressure to the main housing. Passages 38 and 40 convey air from the tube 36 to the piston via a valve 42. A valve stem 44 is caused to move upwardly when the spindle has reached a stop after drilling and countersinking. Moving the valve stem up causes the air passage 38 to be connected to the air passage 40 by the valve 42. This introduces air under pressure into the piston cylinder to raise the piston and disengage the spindle feed train thereby causing the spindle to be retracted. The manner in which this is accomplished will be described with reference to FIGS. 2 through 6.

Figure 2:
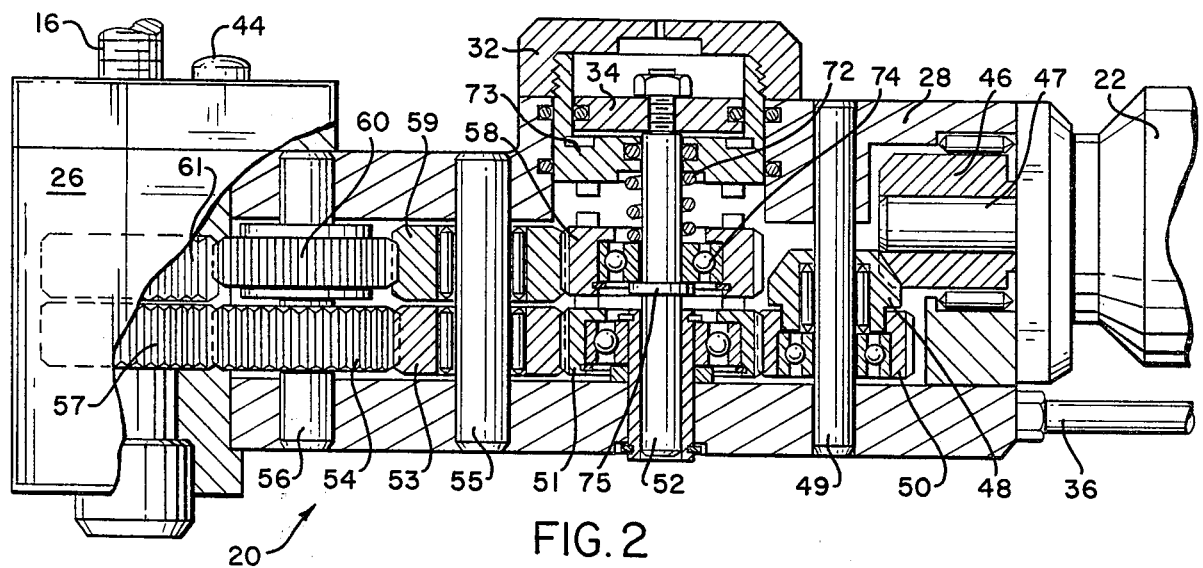
FIG. 2 shows a vertical cross section of the drill shown in FIG. 1.

Referring now to FIG. 2, which shows a vertical cross section of the main housing 20 attached to the motor 22, the general arrangement for driving and feeding the spindle 16 will first be generally described. The present invention will then be described in detail.

A beveled gear 46 keyed on the motor shaft 47 meshes with a beveled gear 48 on a vertical shaft 49. Integral with the bevel gear is a gear 50 which meshes with a coupling gear 51 on a vertical shaft 52 for the spindle drive train comprised of idlers 53 and 54 on respective vertical shafts 55 and 56, and a gear 57 slidably keyed to the spindle 16. Mounted on the shaft 52 is a second coupling gear 58 for the spindle feed gear train comprised of idlers 59 and 60 on shafts 55 and 56, and a spindle feed gear 61 threaded on the spindle 6. As the motor turns, the gear 57 turns, thus turning the spindle. The key, or keys, which cause the spindle to rotate with the gear 57 slide in longitudinal slots or keyways (not shown) in the spindle so the spindle may advance in response to the feed gear 61 turning faster than the drive gear 57.

The feed coupling gear 58 is normally locked onto the drive coupling gear 51 so that it too is driven by the motor through the bevel gears 46 and 48, and the gear 50 locked with the bevel gear 48. Thus the feed coupling gear 58 turns the spindle feed gear 61 through the idlers 59 and 60 while the drive coupling gear 51 turns the spindle drive gear 57 through the idlers 53 and 54. If the gear ratios of both trains were the same, the spindle feed gear 61 would turn with the spindle drive gear 57, and the spindle 16 would not be advanced toward the work piece. Consequently, the gear ratio is made slightly higher for the feed gear 61 so that, as it turns faster than the spindle drive gear 57, its threads engaging the threaded spindle will feed the spindle toward the work piece at a rate proportional to the difference in speed of rotation of the gears 57 and 61.

All of the gears are suitably mounted on ball bearings and needle bearings for rotation without axial motion, as in the prior art. This is also true about the drive and feed gears (57 and 61), except that these gears and the spindle 16 and gears 57 and 61 may move relative to the actuator housing 26 against the force of a spring 62 shown in FIG. 3.

Figure 3:
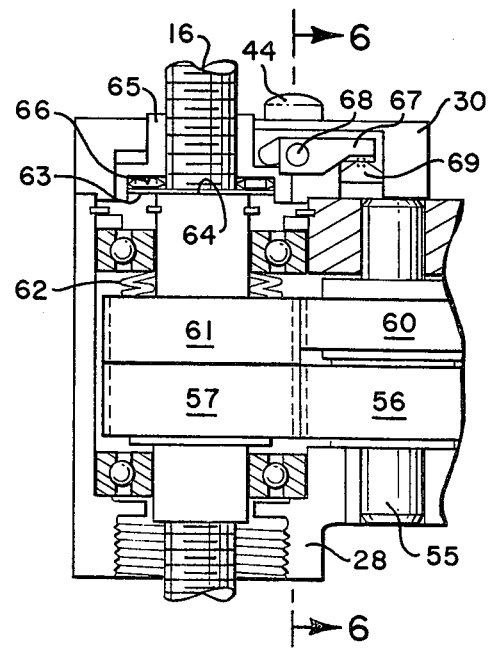
FIG. 3 is a vertical cross section of that portion of the drill shown in FIG. 2 which pertains to the present invention.

Referring now to FIG. 3, when the countersinking drill bit has advanced into the work piece to a stop, continued effort to feed the spindle into the work piece only causes actuator housing 26 to tend to move upwardly, but since it is held, or clamped, against the work piece, the effect is for the spindle feed gear 61 to move upwardly against the spring 62. A thrust bearing race 63 against a shoulder 64 on the spindle feed gear 61 supports a collar 65 through needle bearings 66. As the collar 65 moves upwardly with the spindle feed gear 61, it actuates a lever 67 which pivots on a pin 68 shown in FIGS. 3 and 4. The lever 67 actuates a lever 69 which pivots on a pin 70 shown in FIGS. 4 and 5. This lever 69 carries a pin 71 which extends into the valve stem 44 to move it upwardly in the valve 42 (FIG. 1). This connects air under pressure from the tube 36 through passages (38 and 40) in the main housing. This air under pressure forces the piston 34 upwardly against the force of a spring 72 between the piston cylinder 73 and bearing 74 supported on a flange 75 to disengage the feed coupling gear 58 from the drive coupling gear 51, and to lock teeth on top of the feed coupling gear against teeth on the bottom of the cylinder 73. This locks the feed gear train and causes the spindle to be retracted as the drive gear 57 continues to rotate in the same direction.

Once the spindle is retracted, power to the motor 22 is removed by releasing the lever 24, and the spindle stops turning. To reset the spindle feed gear train for the next drilling operation, the valve stem 44 is manually pushed down into the housing 26. This is easily done as it now protrudes more out of the housing than before, In the meantime, the spring 62 restores the spindle feed gear 61 to its normal position shown in FIG. 3 once retraction of the spindle is commenced.

The valve stem 44 fits into a valve 76 shown in more detail in FIG. 7a. Air under pressure from the passage 38 (FIG. 1) passes through an orifice in the housing 26 next to an annular groove 77 around the outside of the sleeve. Two diametrically opposite openings 78 (only one of which is shown in FIG. 7a) are provided through the sleeve at the center of the groove 77 so that air in the groove will pass into the sleeve while the openings 78 are not covered by the valve stem 44. Similarly an internal groove 79 is provided with an opening 80 through the sleeve 76. This opening is aligned with the passage 40 to the piston cylinder so that while the groove 79 is not covered by the valve stem 44, air entering the sleeve 76 may pass around a reduced diameter section 81 of the valve stem 44 shown in FIG. 7b. Normally, the valve stem is in the position shown in FIG. 6, where a full diameter section 82 covers the internal groove 79, in which case air under pressure enters through the openings 78 and surrounds the reduced diameter portion 81 of the valve stem 44. When the valve stem is moved up a distance about equal to the length of the full diameter portion 82, the internal groove 79 is uncovered and the opening 80 may pass air under pressure to the passage 40 to actuate the piston 34.

A slot 83 in the valve stem 44 receives the pin 71 (FIG. 4) that raises the valve stem 44 when the lever system is actuated. (Note the amplification of the actuation of the lever 67 by the lever 69 due to its pivot pin 70 being so much closer to the lever 67 than the pin 71.) A hole 84 connects to an axial passage 85 in the valve stem 44 which intersects the slot 83 and permits air under pressure from cylinder 73 to exhaust to the atmosphere. When the valve is manually pushed down, the full diameter ends of the valve stem so fit in the sleeve as to provide a seal sufficiently tight for the purpose. An O-ring 86 is provided not for sealing but for increasing friction between the valve stem and sleeve.

To change the tool from one for countersinking drilled holes to one for simply drilling holes, the cap 30 which carries the lever system for the valve stem 44 is removed by simply removing screws 87 shown in FIG. 4 and lifting the cap off the housing 26. The pin 71 engaging the valve stem 44 will lift the valve stem out of the sleeve. The cap 30 is then replaced with a thin plate 88 shown in FIG. 8, and the valve stem is replaced with an alternate valve stem 89 inserted in the valve sleeve 76 from the end opposite the plate 88. Once the alternate valve stem 89 has thus been inserted, an arm 90 is attached to the upper end of the valve stem 89 by a screw 91. Next a nut 92 is threaded on the spindle 16 protruding out of the top of the housing 26 to a distance away from the arm 90 equal to the distance that the spindle is to be advanced for drilling through, or into, a work piece before being retracted.

In this alternate valve actuating arrangement, the valve sleeve remains the same, but since the valve stem is now to be moved downwardly to actuate the hydraulic piston 34, a valve stem 89 is configured differently, as shown in FIG. 7c. A reduced diameter section 93 has a slot 94 extending into one full diameter end 95. The other full diameter end 96 has an o-ring 97 and a button 98 for manually pushing it up into its reset position. In the reset position, the full diameter section 96 covers the orifice 78 (FIGS. 7c and 8) in the valve sleeve 77 to block air under pressure from the passage 38. In this position, cylinder 73 is vented to the atmosphere by slot 94 which now protrudes above the sleeve 76. The arm 90 (FIG. 8) secured to the upper end of the valve stem is engaged by the nut 92 on the threaded spindle 16 to push the valve stem downwardly. At this point slot 94 is inside sleeve 76, blocking the exhaust. Then the full diameter section uncovers the orifice 78. With the orifice 80 remaining in communication with the space between the reduced diameter portion of the valve stem and the sleeve by the internal groove 79, air under pressure is now admitted to cylinder 73.

It is thus evident that the positive feed drill shown in FIGS. 1 and 2 can be quickly converted in the field from one for countersinking with automatic retraction of the spindle to one for drilling, again with automatic retraction, and that the extent of advance of the spindle for drilling can be easily adjusted by a nut. To be certain that the nut does not turn on the spindle, and thus alter the adjustment, a second nut may be tightened against the adjusting nut to increase the friction of the threads in the adjusting nut against the threads on the spindle. Other modifications and equivalents may readily occur to those skilled in the art. Consequently, it is intended that the claims be interpreted to cover such modifications and equivalents.

What is claimed is:

1. In a positive feed power drill having both a spindle drive gear train and a spindle feed gear train in a housing, and having hydraulic means for actuating a piston in a cylinder to the feed gear train for automatic retraction of the spindle, an improvement comprised of a valve in said hydraulic means utilizing a sleeve parallel to said spindle having only two axially displaced orifices, a first orifice connected to a passage from a source of fluid under pressure, and a second orifice connected to a passage from said sleeve to said cylinder to drive said piston therein, said valve having a valve stem with a reduced diameter portion between ends thereof, said reduced diameter portion being of a length sufficient to span both orifices, said valve stem having said reduced diameter portion at one end to span both orifices upon being moved in one direction, and further comprising valve actuating means at an upper end of said housing for moving said valve stem from a position having said reduced diameter portion over only orifice to a position over both orifices to automatically lock the feed gear train when the spindle has been driven a predetermined extent while countersinking, said one of two interchangeable valve stems being comprised of a collar supported on a shoulder of a spindle feed gear, and lever means over said collar for moving said valve stem in said opposite direction when said spindle feed gear causes said collar to move up on said spindle as said spindle feed gear threads upwardly on said spindle once said spindle is constrained from being fed further relative to said housing.

2. In a positive feed power drill having both a spindle drive gear train and a spindle feed gear train in a housing, and having hydraulic means for actuating a piston in a cylinder to the feed gear train for automatic retraction of the spindle, an improvement comprised of a valve in said hydraulic means utilizing a sleeve parallel to said spindle having only two axially displaced orifices, a first orifice connected to a passage from a source of fluid under pressure, and a second orifice connected to a passage from said sleeve to said cylinder to drive said piston therein, said valve having one of two interchangeable valve stems, each valve stem having a reduced diameter portion between ends thereof, said reduced diameter portion being of a length sufficient to span both orifices, one valve stem having said reduced diameter portion at one end to span both orifices upon being moved in one direction, and the other valve stem having said reduced diameter portion at the other end to span both orifices upon being moved in a direction opposite said one direction, and further comprising separate interchangeable valve actuating means at an upper end of said housing for moving said one of two interchangeable valve stems from a position having said reduced diameter portion over only one orifice to a position over both orifices to automatically lock the feed gear train when the spindle has been driven a predetermined extent while drilling and while countersinking, respectively, said one valve stem being selected for drilling with its relative valve actuating means, said valve actuating means for drilling being comprised of an arm extending from an upper end of said one valve stem and means adjusted in height on the upper end of said spindle corresponding to the extent of spindle travel desired before retraction for engaging said arm as said spindle is fed, thereby causing said spindle to be retracted when said arm is engaged by said means on said spindle, said other valve stem being selected for countersinking with its respective valve actuating means, said valve actuating means for countersinking being comprised of a collar supported on a shoulder of a spindle feed gear, and lever means over said collar for moving said valve stem in said opposite direction when said spindle feed gear causes said collar to move up on said spindle as said spindle feed gear threads upwardly on said spindle once said spindle is constrained from being fed further relative to said housing.

* * * * *